United States Patent [19]

Petit

[11] Patent Number: 4,534,227
[45] Date of Patent: Aug. 13, 1985

[54] DEVICE FOR MEASURING THE FLOW OF A FLUID

[75] Inventor: Roland Petit, Dreux, France

[73] Assignee: L'Air Liquide, Societe Anonyme pour l'Etude et l'Exploitation des Procedes Georges Claude, Paris, France

[21] Appl. No.: 553,353

[22] Filed: Nov. 18, 1983

[30] Foreign Application Priority Data

Nov. 26, 1982 [FR] France .................. 82 19839

[51] Int. Cl.³ .................. G01F 1/06; G01F 11/02
[52] U.S. Cl. .................. 73/861.87; 73/253
[58] Field of Search .......... 73/861.79, 861.88, 861.87, 73/253, 254, 259, 260

[56] References Cited

U.S. PATENT DOCUMENTS

| 74,254 | 2/1868 | Taggart | 73/861.88 |
| 440,559 | 11/1890 | Glad | 73/861.88 |
| 2,906,121 | 9/1959 | Knauth | 73/861.88 |
| 3,526,133 | 9/1970 | Love et al. | 73/861.87 |

FOREIGN PATENT DOCUMENTS

| 433573 | 4/1939 | Belgium . |
| 1076 | 8/1877 | Fed. Rep. of Germany . |
| 18979 | 7/1881 | Fed. Rep. of Germany . |
| 806735 | 6/1951 | Fed. Rep. of Germany . |
| 808422 | 2/1937 | France . |

OTHER PUBLICATIONS

Whelan, "Miniature Low-Flow-Rate Turbine Flowmeter for High Pressure", in Journ. Phys. E. Scien. Inst., vol. 12, #6, 1979, pp. 553-556.

Primary Examiner—Herbert Goldstein
Attorney, Agent, or Firm—Young & Thompson

[57] ABSTRACT

The device measures the flow of a fluid and comprises a rotor 16 having vanes which is driven in rotation by a stream of fluid in a sealed housing 11 having a circular cross-section and provided with a supply nozzle and a discharge nozzle for the fluid which are in alignment and disposed tangentially to the rotor so that the fluid stream issuing from the supply nozzle encounters the vanes 1 in a direction perpendicular to the axis of rotation 17 of the rotor. The rotor 16 has two lateral flanges 16a, the vanes, the flanges and the housing defining, apart from a clearance for permitting the rotation of the rotor, a series of compartments which communicate by way of that clearance with two lateral chambers 12a of the housing. The invention is in particular applicable to the measurement of small flows of gas under high pressure.

7 Claims, 8 Drawing Figures

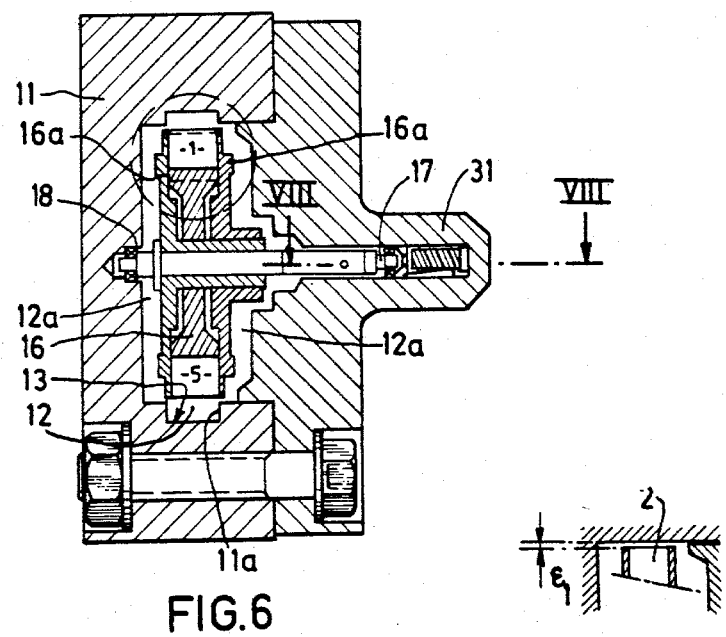
FIG.6
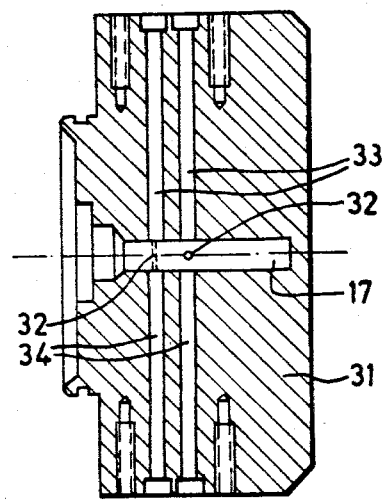
FIG.7
FIG.8

4,534,227

DEVICE FOR MEASURING THE FLOW OF A FLUID

The invention relates to a device for measuring the flow of a fluid, of the type comprising a sealed housing in which a rotor having equidistant radial vanes is mounted to rotate freely about its axis and which is provided with fluid supply and discharge nozzles, said nozzles being in alignment and disposed tangentially to the rotor so that the stream of fluid issuing from the supply nozzle encounters the vanes in a direction perpendicular to said axis of rotation.

Manufacturers of devices for measuring fluid flow, and in particular gas flow, offer on the market a range of equipment which at present permits measuring with precision the highest flows but in which the lower limit is in the region of 1 m$^3$/h (real or uncorrected) (ie. 1 m$^3$/h under real conditions of temperature and pressure). If the pressure is comparatively high, flows are difficult to measure. A simple example will enable this to be understood; a flow of 5 Nm$^3$/h at 20 bars gives, as a first approximation, an uncorrected flow of 0.250 m$^3$/h, consequently distinctly lower than the minimum value indicated above. Under these conditions, the metering is inaccurate or non-existent, which is unfortunate when the considered gas is expensive, for example hydrogen.

A simple type of equipement is at present capable of measuring flows lower than one cubic meter (uncorrected); it comprises a meter using bellows and is termed a "membrane meter". However, its use under pressure presents problems which are such that constructors do not complete construction but rather leave it to the client to construct the pressure enclosure in which the meter will be mounted. These meters operate down to 0.1 m$^3$/h (uncorrected), but their use under pressure is uncertain and they do not permit a simple automatization of the calculation, of the corrected flow, i.e. a flow brought to standard (or normal) conditions of temperature and pressure.

An object of the invention is to overcome the aforementioned drawbacks and to provide a device for measuring the flow of a fluid which is not only capable of measuring low flows but also has the advantage of being capable of use over a very wide pressure range starting at atmospheric pressure and within a wide range of flows.

The invention therefore provides a device of the aformentioned type, wherein the rotor has two lateral flanges, the vanes, the flanges and the housing defining, apart from a clearance between the flanges and the housing to allow the rotation of the rotor, a series of compartments which communicate through said clearance with two lateral chambers of the housing.

With this arrangement, the vanes and the lateral flanges of the rotor trap successive volumes of fluid in the manner of a succesion of pistons moving in a cylinder, regardless of the profile of the velocities in the lateral chambers of the housing. This imparts to the device the volumetric characteristic essential to the measurement of small flows and is in contrast to the design of velocity meters such as the device of Belgian Pat. No. 433,573 which is of the type mentioned at the beginning of the present specification but which in no way permits measurement of small flows because a large part of the fluid flows to one side of the rotor.

According to another feature of the invention, the radial distance between the end of each vane and the inner wall of the housing is variable, this distance reaching a minimum value in the region where the vanes receive the stream of fluid issuing from the supply nozzle and a maximum value opposite said region. In a preferred embodiment, the diametrical offset of the rotor starts at a point located a little upstream of the supply nozzle with respect to the direction of rotation of the rotor.

Furthermore, if the device is combined with a device for detecting the speed of rotation of the type employing fibre optics, the speed detecting moment is completely cancelled out, which results in maximum sensitivity.

Two embodiments of the invention will now be described with reference to the accompanying drawings in which:

FIGS. 4 to 7 are sectional views taken along lines IV—IV to VII—VII respectively of FIG. 3, and FIG. 8 is a sectional view taken along line VIII—VIII of FIG. 6.

Figure 1:
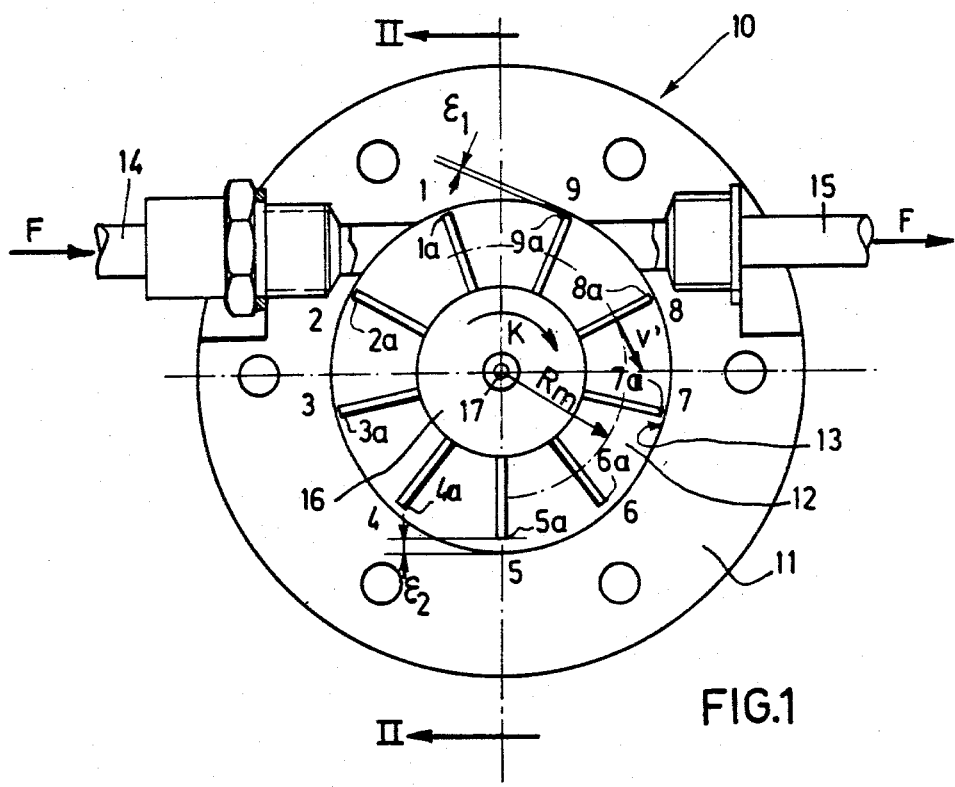
FIG. 1 is a diagrammatic view of a device according to the invention, with the housing assumed to be open.
Figure 2:
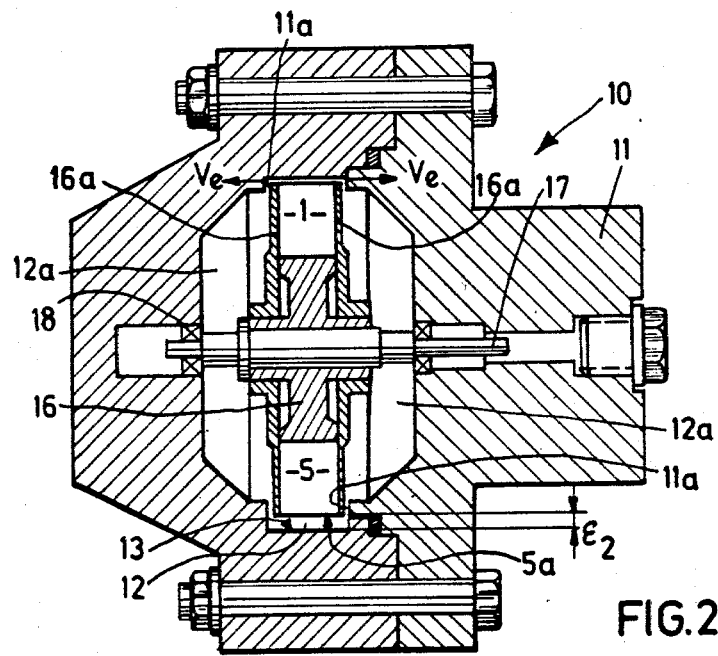
FIG. 2 is an axial sectional view taken along line II—II of FIG. 1.

In the embodiment shown in FIGS. 1 and 2, the flow measuring device, generally designated by the reference numeral 10, comprises a sealed housing 11 in two parts, for example a metal housing provided internally with a cylindrical median chamber 12 having a circular cross-sectional shape, the peripheral wall of which is designated by the reference numeral 13 whereas the lateral walls are designated by the reference numeral 11a. This chamber has adjacent thereto on each side a lateral chamber 12a. Opening onto chamber 12 is a nozzle 14 for the supply and a nozzle 15 for the discharge of a fluid whose flow must be measured, said fluid flowing in the direction of the arrows F. The chamber 12 is produced by counterboring one of the two lateral chambers 12a.

Mounted in the chamber 12 is a rotor or wheel 16 for free rotation about the axis of a shaft 17 and supported by rolling bearings 18. The rotor is provided with radial blades or vanes 1, 2, 3 . . . 9 which are angularly equally spaced apart and have a rectangular shape. This rotor, provided with its vanes, has a mean radius Rm, measured between the axis 17 and the centre of the vanes 1 to 9. The number and the disposition of the vanes are such that the fluid issuing from the nozzle 14 always encounters a vane regardless of the angular position of the rotor.

The two nozzles 14 and 15 are coaxial with each other and their common axis is tangent to the mean circumference of radius Rm of the rotor 16. The cross-sections of these nozzles are identical but are less than or equal to the area Sp of a vane 1, 2, 3 . . . 9 of the rotor.

The circulation of the fluid in the direction of the arrows F has for effect, by the action on the vanes, the rotation of the rotor 16 in the direction of arrow K. The fluid fills the chambers 12 and 12a so that rotor 16 rotates fully immersed in said fluid, but the lateral flanges 16a of the rotor 16 located on each side of the vanes, perpendicular to the shaft 17 and having the same outside diameter as the vanes, canalize the fluid stream issuing from the nozzle 14. The peripheral region of the flanges 16a is in confronting relation to shoulders 11a of the housing 11, perpendicular to the shaft 17, which laterally define the chamber 12. The rotor is inserted between these two shoulders.

In order to ensure the rotation, a clearance must be provided between everything that rotates and everything that is fixed. This clearance of necessity results in a leakage flow creating pressure differences. This is why an axial clearance which is just necessary to permit the rotation of the rotor and is constant about the periphery is provided between each flange 16a and the adjacent shoulder 11a.

The ends 1a and 9a of the vanes 1 and 9 which, in the illustrated position of the rotor, are located between the two nozzles 14 and 15, are at a minimum radial distance from the inner wall 13 of the housing which is sufficient to permit the discharge of almost all of the leakages. This distance $\epsilon 1$ corresponds to a leakage area s.

In assuming that the rotor is stationary, the leakage flow through the section s produces a pressure difference between the sides of the vane 1 which receives the stream of fluid issuing from the inlet nozzle 14. This is manifested by a force tending to drive the vane in the direction of arrow K. Consequently, the rotor 16 rotates so long as the driving torque thus produced exceeds the resisting torque.

These conditions determine the value of the starting up Qo. For a given fluid, this value will be the lower as all the resisting forces exerted on the bearings for the rotor are smaller.

When the rotor is rotated, the driving torque or moment results from the effect of two forces applied to the vanes 1. One of these forces always depends on the differential pressure created by the leakage flow, the other is a function of the variation in the amount of movement of the volume of fluid driven by the rotor. This volume is that of the compartment defined by two vanes, the wall 13 of the housing and the two lateral flanges 16a.

The leakages have a lower velocity than when starting up, since the peripheral velocity of the rotor is no longer nil. The influence of the leakage flow is then of the second order.

Added to the resisting moment due to the mechanical friction forces, which are restricted to the friction within the bearings 18, is that created by the device for detecting the rotation on one hand, and that generated by the viscosity forces on the other hand.

The velocity detecting moment is completely cancelled out when a detecting device employing fibre optics (not shown) of any suitable type is used.

The viscosity moment is highly reduced by the judicious choice of the clearances between the housing 11 and the rotor 16. This is why the end 5a of the vane 5 which is opposed to the vanes 1 and 9 is at a radial distance $\epsilon 2$ from the inner wall 13 of the housing which is distinctly greater than the aforementioned distance $\epsilon 1$. This difference in the clearances between the ends of the vanes and the wall of the housing may be obtained for example by a slight off-centre position of the counterbore consituting the chamber 12 relative to the lateral chambers 12a and to the rotor 16.

The flow meter just described thus permits the measurement of low flows of fluids regardless of their pressure.

It must be understood that many modifications may be made in the device shown in FIGS. 1 and 2. In particular, the number of vanes may be larger or smaller than nine, provided two successive vanes can be simultaneously located between the nozzles 14 and 15. Furthermore, there may be employed, instead of the rolling bearings for the rotor, any other kind of bearings, including fluid bearings.

Figure 3:
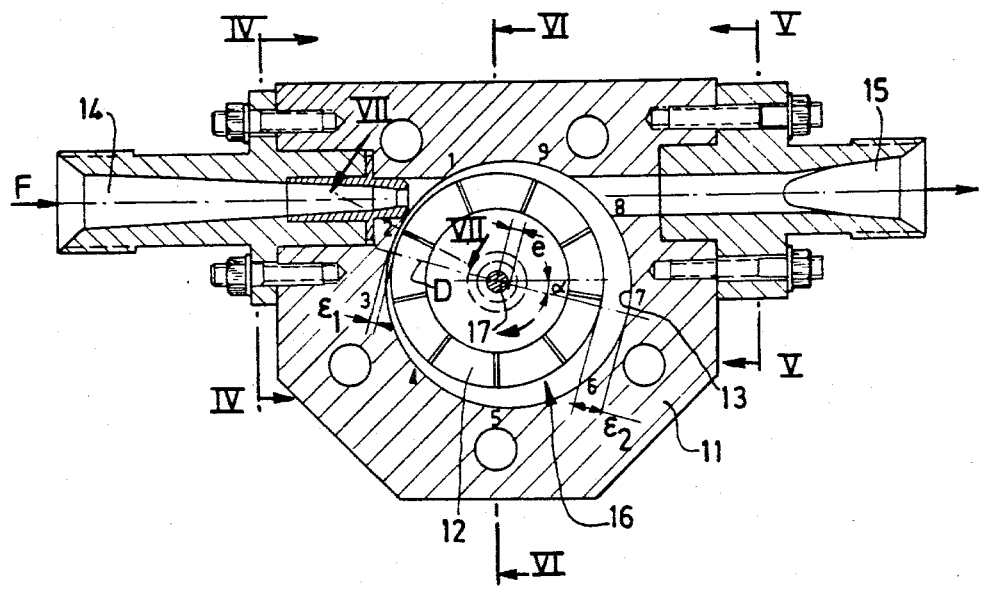
FIG. 3 is a longitudinal sectional view of another embodiment of the device according to the invention.
Figure 4:
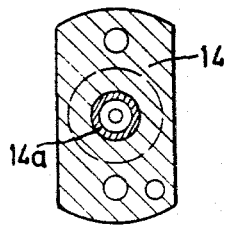
Figure 5:
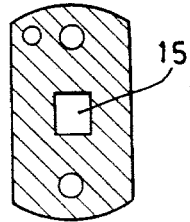

The embodiment shown in FIGS. 3 to 8 has on the whole the same structure as that shown in FIGS. 1 and 2 and the corresponding elements are designated by the same references. The differences are as follows:

The chamber 12 is narrower so that the shoulders 11a are in alignment with the flanges 16a with a minimum and constant radial clearance $\epsilon 1$ throughout the circumference. As a matter of fact, it is only necessary that this clearance be minimum in the region of the nozzle 14. The radial depth of the counterbore is nil at the point where the clearance beween the vanes and the wall 13 is minimum and therefore equal to $\epsilon 1$ (FIG. 7), and this depth increases progressively to the point where the clearance between these vanes and this wall is maximum and equal to $\epsilon 2$;

The off-centre $e = \epsilon 1 - \epsilon 2$ thus defined is arranged along an inclined diameter D which leads to a point just upstream (with respect to the direction of rotation K) of the outlet of the input nozzle 14. This diameter D makes an acute angle $\alpha$ with the horizontal, as can be seen in FIG. 3;

The nozzle 14 is provided with a mounted injector 14a which reduces the effective section. This enables the velocity of the rotor to be increased for a given flow and consequently rapidly results in a turbulent flow of the leakages after starting up. As can be seen in FIGS. 4 and 5, the injector 14a has a circular output section whose area is less than the input section of the nozzle 15, which is rectangular. The area of the latter is equal to that of the vanes 1 to 9.

Shown diagrammatically in FIGS. 6 and 8 is the detecting device employing fibre optics which is also suitable for the embodiment shown in FIGS. 1 and 2. The extension of the rotor shaft 17 is journalled in a projection 31 of the housing 11 and is provided with two passageways 32 perpendicular to each other. Two light-emitting passages and two receiving passages employing fibre optics (not shown) are inserted in the radial passageways 33, 34 which are in confronting relation in pairs and are periodically put into communication with each other by way of the passageways 32 when the rotor rotates. The light signals received by the receiving passages are analyzed by a suitable electronic device (not shown), which thus provides an indication of the velocity of the rotor.

It has been found surprisingly that the flow/velocity characteristic of the device shown in FIGS. 3 to 8 is substantially linear right from the start of the starting up, so that the fibre optics detector directly provides an indication of the gas flow. This is not the case with the embodiment shown in FIGS. 1 and 2 which requires a function generator.

The device shown in FIGS. 3 to 8 for example permits the measurement of uncorrected flows of hydrogen lower than 500 l/h at a pressure of 100 bars.

What is claimed is:

1. A device for measuring the flow of a fluid comprising a sealed housing, a rotor having radial vanes equally spaced apart mounted in said housing to rotate freely about an axis of rotation, a fluid supply nozzle and a fluid discharge nozzle for the housing, said nozzles being in alignment with each other and disposed tangentially of the rotor so that a stream of fluid issuing from said supply nozzle encounters said vanes in a direction perpendicular to said axis of rotation, said housing defining two lateral chambers on opposite sides of said rotor, said rotor having two lateral flanges on opposite sides of said vanes and connected to said vanes, said vanes and said flanges being radially internally connected to a central member of the rotor, said vanes, said flanges, said central member and said housing defining, apart from a clearance between said flanges and said housing for permitting rotation of said rotor, a series of compartments which communicate through said clearance with said two lateral chambers, each said compartment being bounded laterally by said flanges and a pair of adjacent vanes and being bounded radially outwardly of said rotor by said housing, said supply nozzle and said discharge nozzle opening at all times into different said compartments.

2. A device according to claim 1, wherein said two nozzles have effective cross-sections which are at the most equal to the area of a vane of said vanes and the cross-section of said supply nozzle is at the most equal to the cross-section of said discharge nozzle.

3. A device according to claim 2, wherein said supply nozzle has an output, said discharge nozzle has an input cross-section and said vanes have an area which are identical to each other and exceed the cross-section of said output of said supply nozzle.

4. A device according to claim 1, wherein said housing has an inner wall and a radial distance between an end of each vane and said inner wall of the housing varies, said radial distance reaching a minimum value in a region where said vanes receive the stream of fluid issuing from said supply nozzle and a maximum value opposite said region.

5. A device according to claim 4, wherein a diameter along which said rotor is off-centre relative to said inner wall starts at a point located just upstream of said supply nozzle with reference to the direction of rotation of said rotor in operation of said device.

6. A device according to claim 1, comprising a device including fibre optics for detecting the velocity of rotation of said rotor.

7. A device according to claim 1, said housing having surfaces perpendicular to said axis of rotation that closely approach the peripheries of said flanges to reduce the flow of fluid between said compartments and said two lateral chambers.

* * * * *